United States Patent [19]

Willot et al.

[11] Patent Number: 5,242,664
[45] Date of Patent: Sep. 7, 1993

[54] PROCESS AND APPARATUS FOR THE PREPARATION OF A GAS FLOW

[76] Inventors: Fabien Willot, 30 rue Croix Boisset, 92310 Sevres; Jean Senckeisen, 6 allee des Rives de Bagatelle, 92150 Suresnes, both of France

[21] Appl. No.: 795,599

[22] Filed: Nov. 21, 1991

[30] Foreign Application Priority Data

Nov. 21, 1990 [FR] France .................. 90 14492

[51] Int. Cl.[5] .................. F28D 7/16; G05D 23/13; F17D 1/04
[52] U.S. Cl. .................. 422/200; 422/199; 422/173; 236/12.1; 236/12.11; 137/3; 137/88; 137/89
[58] Field of Search .............. 261/DIG. 26; 422/199, 422/173, 200; 137/88, 3, 89; 110/343; 374/37; 165/27, 30, 101; 252/373; 236/12.1, 12.11

[56] References Cited

U.S. PATENT DOCUMENTS 3,451,783 12/1964 Collins .................. 422/199
3,496,991 2/1970 Barnd .................. 137/3 X

FOREIGN PATENT DOCUMENTS 0110244 2/1986 European Pat. Off. .
0239720 10/1987 European Pat. Off. .
0240780 10/1987 European Pat. Off. .
2180714 11/1973 France .
60-201917 10/1985 Japan .
353954 6/1961 Switzerland .

Primary Examiner—Robert J. Warden
Assistant Examiner—E. Leigh Dawson

[57] ABSTRACT

To prepare a flow of gas at a high temperature of operation, a flow of gas which has previously been heated to a temperature much lower than the operating temperature is divided into two elementary flows, which are thereafter individually heated at higher temperatures, one of which is higher than the operating temperature and the other being lower than the operating temperature. The two flows thus differently heated are each sent to a buffer container which is heat insulated and two elementary gas flows are withdrawn from the containers and are thereafter combined in regulated proportion by means of a mixing valve adjusted at a control mixing position by means of a correcting signal which differentiates between the effective temperature of the gas prepared and a control temperature. Application for example to the manufacture of articles made of expanded foam material utilizing carbon dioxide.

9 Claims, 1 Drawing Sheet

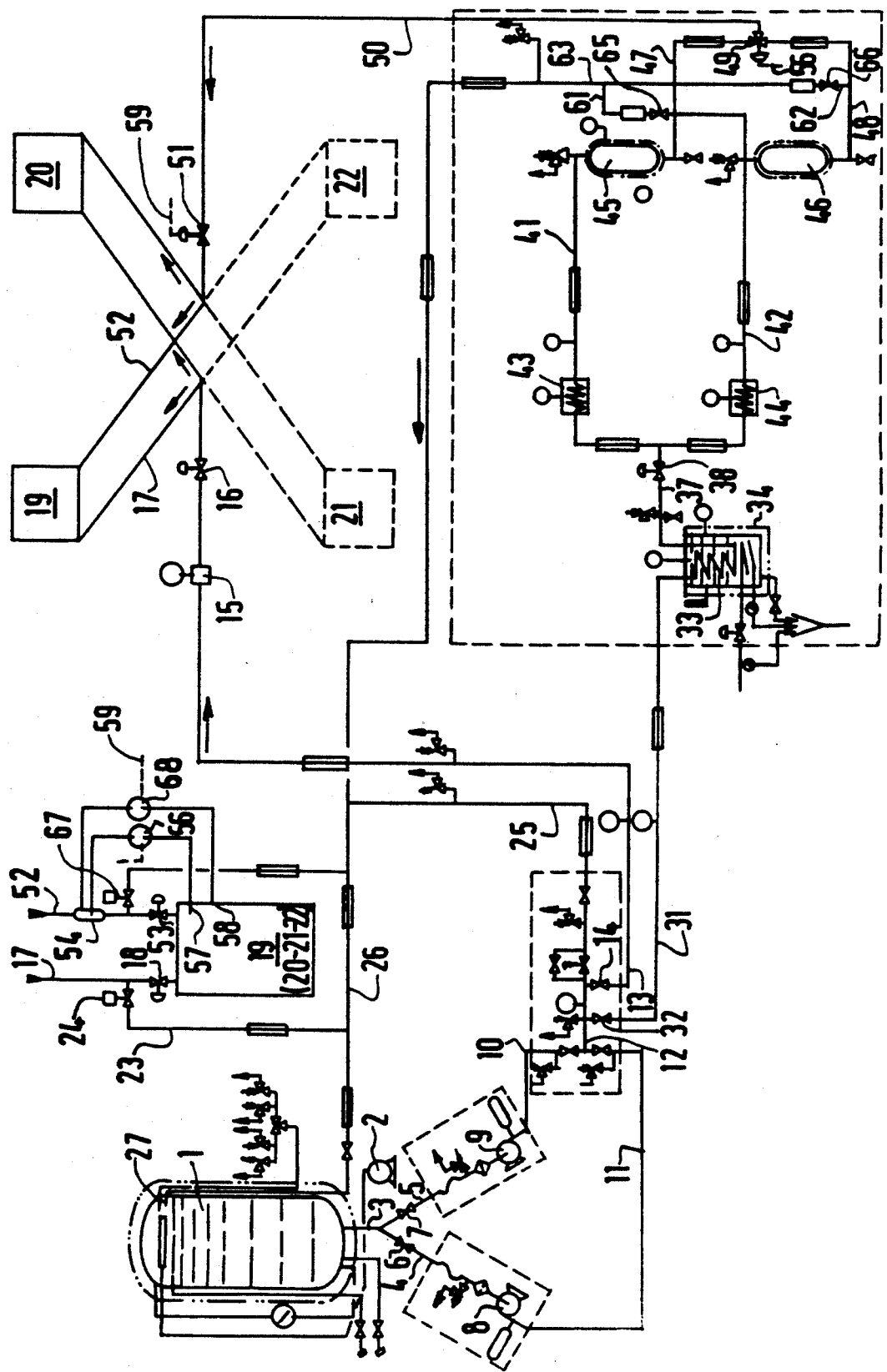

PROCESS AND APPARATUS FOR THE PREPARATION OF A GAS FLOW

BACKGROUND OF THE INVENTION (a) Field of the invention

The invention concerns the preparation of a flow of gas at hot temperature of operation, which can be used for example in the manufacture of articles of expanded foam utilizing carbon dioxide.

(b) Description of Prior Art

In this type of application, but also in numerous other applications, a flow of gas must be prepared at a temperature and a pressure which should be very close to a specific temperature and pressure of operation, which may be the internal temperature of the reactor into which this gas is sent. Now, in the known process and apparatus, the adjustment of this temperature and pressure is too inaccurate to satisfy particularly specific operating requirements with respect to these two parameters.

SUMMARY OF INVENTION

It is an object of the present invention to provide for the preparation of a flow of gas which complies with these requirements in a simple and efficient manner and this result is achieved, in a process according to the invention, by dividing a flow of gas which has been previously heated to a temperature lower than the operating temperature, into two elementary flows, which are thereafter individually heated to warmer temperatures, one being higher than the operating temperature and the other being lower than the operating temperature, the thus differently heated flows each being sent into a heat insulated buffer container, and amounts are withdrawn from the two elementary flows of gas, depending on the demand, these amounts being thereafter combined in controlled proportion by means of a mixing valve in mixing position which is controlled by means of a corrective signal which differentiates between the true temperature of the gas thus prepared and a control value, to constitute the flow of gas at a hot temperature of operation. Experience has shown that this procedure permits a particularly strict control of the temperature.

Preferably, the control temperature is that of the reactor in use, which is compared to the temperature of the gas in operation in the immediate vicinity of said reactor, so as to provide a corrective differential signal which acts on the mixing value.

In addition, the preparation of the flow of gas under operating pressure is carried out by raising the pressure of said gas to a value which is higher than the operating pressure and by giving rise to a controlled expansion which is dependent on a differential signal between the true pressure of the expanded gas and a control pressure.

The invention is also concerned with an apparatus for the preparation of a flow of gas at a high temperature of operation comprising a gas storage container, means for heating a flow of gas associated with a temperature regulator means which is controlled by a comparator between the true temperature of the gas prepared and a control temperature, characterized in that there is provided a first means for heating at a temperature substantially lower than said operating temperature, two gas circuits arranged parallel downstream of the heating means, each incorporating an additional heating means of which the heating capacities are differentiated and a heat insulated buffer container, the circuits leading to a regulated mixing valve, whose outlet is connected to a gas distribution duct, the regulator means acting on the control position of the mixing valve.

BRIEF DESCRIPTION OF DRAWINGS

Other characteristics and advantages of the invention will appear from the description which follows with reference to the annexed drawing, in which:

The single FIG. is a schematic illustration of an apparatus according to the invention.

DESCRIPTION OF PREFERRED EMBODIMENTS

In the drawing, there has been illustrated an apparatus for the manufacture of articles of expanded foam comprising four reactors 19, 20, 21, 22, supplied with carbon dioxide which is stored in a container 1 and which is kept liquid by means of a refrigerating unit 2. A liquid gas withdrawing duct 3 is divided into two elementary ducts 4 and 5 equipped with shut-off valves 6 and 7 and incorporating pumps 8 and 9 supplying carbon dioxide under a pressure on the order of 70 bars to duct portions 10 and 11 leading to a single duct 12. This duct 12 feeds a liquid carbon dioxide duct 13 including a valve 14, a digital volume counter 15, a controlled opening valve 16, and ends into a duct 17 for successively feeding either one of the reactors 19, 20, 21, 22. Each channel 17 includes a valve 18, upstream of which a flushing circuit 23 with stopping valve 24 is connected and which opens into a general flushing duct 26 opening, at 27, at the top of the container 1.

On the other hand, duct 12 feeds another distribution duct 31 including a valve 32, a heating vaporizer 34, including a coil 33, of the vapor type, supplying at the outlet 37 gaseous carbon dioxide under a pressure of $70 \times 10^5$ Pa at a temperature on the order of 70° C. upstream of a safety valve 38, from which originates two gas circuits mounted in parallel 41 and 42 each including a heating device 43, 44 and, downstream, a buffer container 45 and 46. Ducts 47 and 48 for bleeding the bottom portion of the buffer containers 45 and 46 are connected to the inlets of a control mixing valve 49 in which the outlet ends into a distributor duct 50, including a control expander 51, and supplying the gaseous mixture thus prepared to individual ducts 52 toward either one of the reactors 19, 20, 21, 22 each duct 52 including a bulb 54 and a stop valve 53, and a flushing valve 67.

Flushing ducts 61–62 including valve 65 and 66, are provided downstream of the containers 45–46 to reach the general flushing duct 26.

The heaters 43 and 44, of the type including an electric resistance embedded in a matrix of aluminum, have different electrical powers, so as to enable the gas at the outlet of the heater 43 to be at a lower temperature than the temperature of the gas at the outlet of the heater 44. For example, the gas in duct 41 and which is stored in buffer container 45 is heated at a temperature of about 140° C., while the gas which is carried by duct 42 and is stored in buffer container 46 is heated to a higher temperature, of about 180° C.

To maintain these temperatures as constant as possible as a function of time and notwithstanding the bleeding flow, there is provided at the level of each buffer container 45-46 escape ducts 61-62 which end into a common escape duct 63 leading to the flushing duct 26.

The control mixing valve 49 is controlled by a regulator 56 which is dependent on two temperature measuring devices, one temperature measuring device in bulb 54 and a temperature measuring device 57 in reactor 19 (20-21-22), such that the temperature at the level of bulb 54 is as close as possible, and even identical to temperature 57 in the reactor which is used as control temperature.

The regulated pressure reducer 51 in duct 50 is also controlled by a signal transmitted at 59 from a regulator 68 operating as a function of the pressure difference measured in bulb 54 and in reactor at 58, so as to reduce, and even cancel, the pressure difference between the one in bulb 54 and that at 58 in the reactor.

The apparatus which has just been described operates in the following manner:

in a first phase, it is intended to send into a reactor, for example reactor 19, a flow of liquid carbon dioxide whose value should be progressively increasing and whose total amount should be well determined. For this purpose, during a first time lapse, liquid flushing valve 24 of the reactor under consideration is closed, flow control valve 16 is completely opened and, after a few seconds, the liquid flushing valve 24 is opened until there is detected an uninterrupted flow of liquid during a time lapse of about 10 seconds, after which, the control valve 16 is pre-positioned with a small opening (about 5%), the liquid flushing valve 24 is closed and the reactor valve 18 is opened. A regulator (not illustrated) ensures the progressive opening of the valve 16 up to a maximum desired flow and this takes place until the entire amount of liquid sent by the apparatus 16 corresponds to the quantity of liquid which should be injected into the reactor. Once this value has been reached, the liquid inlet valve 18 is closed and the flushing valve 24 as well as the flow regulator valve 16 are opened.

This measured supply of liquid carbon dioxide acting as an expanding agent is followed by the supply of a flow of gaseous carbon dioxide at a specific temperature and pressure. This supply operates in the following manner: the regulator 56 ensures a mean opening position of the mixing valve 49. The pressure regulator 56 ensures the opening and closing of the pressure regulator valve 51. After a time lapse of about 2 seconds, the gas flushing valve 67 is opened. Once these preparations are completed, a pressure regulation is initiated according to a control value given by the regulator 68 corresponding to a zero pressure difference between the pressure at 58 inside the reactor 19 (20-21-22), and the pressure of the gas distributing duct at 54 and this control of the pressure is kept active until the end of the gas distribution cycle. During this phase, flushing valve 67 remains opened, after which, the temperature regulation is initiated while ensuring that the regulator 56 controls the mixing valve 49 so as to give a differential temperature of zero between the measuring point 54, in the distributing duct 52, and 57, inside the reactor. The flushing valve 67 is then closed, and the reactor valve 53 is opened while flushing the reactor.

The gas valve 53 of the reactor is thereafter closed, the gas flushing valve 67 is opened, and simultaneously, pressure regulator valve 51 is closed and mixing valve 49 is put back into median position.

As described, the invention is applicable first to reactors in which gaseous carbon dioxide is used under specific pressure and temperature, but could also be used for supplying another gas under the same conditions.

We claim:

1. A method of preparing a flow of a gas at a selected temperature, comprising the steps of:
    providing a source of gas;
    delivering a flow of said gas at a first pressure from said source and at a first temperature substantially lower than a selected temperature;
    dividing said flow into first and second flows;
    heating the first flow to a second temperature higher than the first temperature and lower than the selected temperature and temporarily storing at least part of the heated first flow at the second temperature in a first insulated tank;
    heating the second flow to a third temperature higher than the selected temperature and temporarily storing at least part of the heated second flow at the third temperature in a second insulated tank;
    extracting from the first insulated tank a third flow of gas at the second temperature;
    extracting from the second insulated tank a fourth flow of gas at the third temperature;
    mixing the third and fourth flows to obtain a fifth flow, the third and fourth flows being monitored so that the fifth flow is substantially at the selected temperature.

2. The method of claim 1, further comprising the step of expanding the pressure of the fifth flow to a selected second pressure, lower than the first pressure.

3. The method of claim 1, wherein the source of gas contains said gas in a liquid form and wherein said gas in liquid form is vaporized to obtain the flow of gas at the first pressure and the first temperature.

4. The method of claim 3, wherein the gas is $CO_2$.

5. A method of manufacturing articles out of an expanded foam material in an article work station, which comprises the following steps:
    providing a source of liquid $CO_2$ under pressure;
    supplying liquid $CO_2$ as an expanding medium to the work station;
    interrupting the supplying of liquid $CO_2$;
    extracting from the source of flow of liquid $CO_2$ and vaporizing said flow of liquid to obtain a flow of gaseous $CO_2$ at a first pressure and a first temperature;
    dividing the flow of gaseous $CO_2$ at the first pressure and the first temperature into first and second flows;
    heating the first flow to a second temperature higher than the first temperature and lower than a selected temperature and temporarily storing at least part of the heated first flow at the second temperature in a first insulated tank;
    heating the second flow to a third temperature higher than the selected temperature and temporarily storing at least part of the heated second flow at the third temperature in a second insulated tank;
    extracting from the first insulated tank a third flow of gas at the second temperature;
    extracting from the second insulated tank a fourth flow of gas at the third temperature;
    mixing the third and fourth flows to obtain a fifth flow, the third and fourth flows being monitored so that the fifth flow is substantially at the selected temperature; and supplying the fifth flow substantially at the selected temperature, as a driving gas, to the work station.

6. The method of claim 5, wherein the fifth flow of driving gas is expanded to a selected second pressure before being supplied to the work station.

7. In a plant for producing articles out of an expanded foam material in at least one expansion reactor, a fluid supplying apparatus comprising:
- a reactor;
- a reservoir of liquid $CO_2$;
- pump means for supplying liquid $CO_2$ from the reservoir to a liquid $CO_2$ feed line;
- a first circuit connecting the feed line to the reactor for supplying the reactor with liquid $CO_2$ under pressure;
- a second circuit connecting the feed line to the reactor for supplying the reactor with gaseous $CO_2$ under pressure, the second circuit comprising:
- a pre-heating means discharging vaporized $CO_2$ in an upstream gas line,
- the upstream gas line dividing into parallel first and second circuit portions, each circuit portion including, serially arranged, a post heating means, a thermally insulated tank and an outlet conduit,
- the outlet conduits merging via a control mixing valve into a supply line in fluid communication with the reactor,
- temperature sensing means in the supply line, and
- temperature control means operatively coupled to the control mixing valve and receiving signals from the temperature sensing means.

8. The apparatus of claim 7, further comprising a control expansion valve in the supply line.

9. The apparatus of claim 8, comprising a pressure control means operatively coupled to the control expansion valve and comprising a pressure sensor in the supply line.

* * * * *